Figure 2:
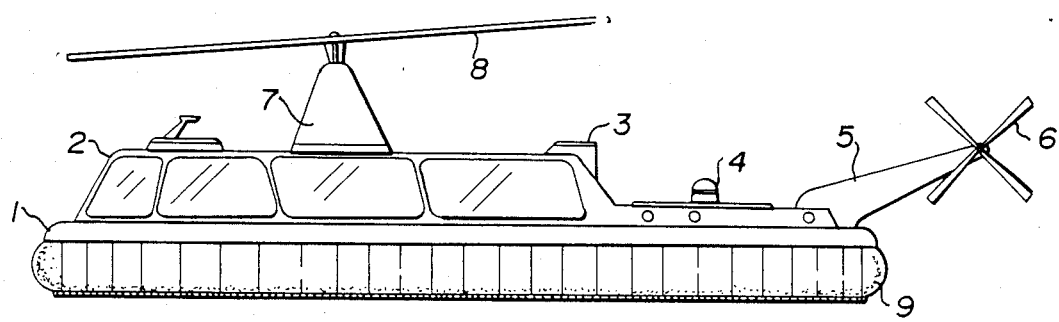

United States Patent [19]
Yarrington

[11] Patent Number: 4,984,754
[45] Date of Patent: Jan. 15, 1991

[54] HELI-HOVER AMPHIBIOUS SURFACE EFFECT VEHICLE

[76] Inventor: Arthur Yarrington, M.S. 1073 Crows Nest, Queensland, Australia, 4355

[21] Appl. No.: 501,350

[22] Filed: Mar. 28, 1990

Related U.S. Application Data

[63] Continuation of Ser. No. 198,818, filed as PCT AU87/00218 on Jul. 16, 1987, published as WO88/00899 on Feb. 11, 1988, abandoned.

[30] Foreign Application Priority Data

Jul. 28, 1986 [AU] Australia .............................. PH7155

[51] Int. Cl.⁵ ............................................. B64C 37/02
[52] U.S. Cl. ..................................... 244/2; 244/17.110
[58] Field of Search ................... 244/2 R, 12.1, 17.11, 244/23 R, 100 A; 114/67 A; 180/116, 118, 122, 128

[56] References Cited

U.S. PATENT DOCUMENTS

| | | | |
|---|---|---|---|
| 3,106,260 | 10/1963 | Bollum | 114/67 A |
| 3,130,939 | 4/1964 | Alper et al. | 244/2 |
| 3,175,785 | 3/1965 | De Tore et al. | 180/129 |
| 3,285,535 | 11/1966 | Crowley | 244/2 |
| 3,399,644 | 9/1968 | Hunt | 114/67 A |
| 3,817,479 | 6/1974 | Crowley | 244/2 X |
| 4,067,516 | 1/1978 | Dobb | 114/67 A X |

FOREIGN PATENT DOCUMENTS 6410085  3/1965  Netherlands ........................ 244/12.1

Primary Examiner—Joseph F. Peters, Jr.
Assistant Examiner—Anne E. Bidwell
Attorney, Agent, or Firm—Armstrong, Nikaido, Marmelstein, Kubovcik and Murray

[57] ABSTRACT

A heli-hover amphibious craft which includes a main hover craft fuselage body structure including a single hull provided with a deck. The hull is defined by a compartmental under base cavity extending downward with divisional and perimeter walls formed by air cushion containing structure for containing suspension air. The fuselage body is provided with at least one built-in duct extending through said deck to said base cavity. At least one deck mounted fan is provided for delivering pressurized air through the duct. A superstructure is attached to the fuselage body. At least one horizontally rotating heli-rotor assembly is supported well above the deck by the superstructure, with the heli-rotor assembly being driven by a substantially vertically fixed shaft. An anti-torque device provided on an aft portion of the fuselage body. A drive mechanism is operatively connected to the heli-rotor assembly and the anti-torque device for propelling the craft.

5 Claims, 4 Drawing Sheets

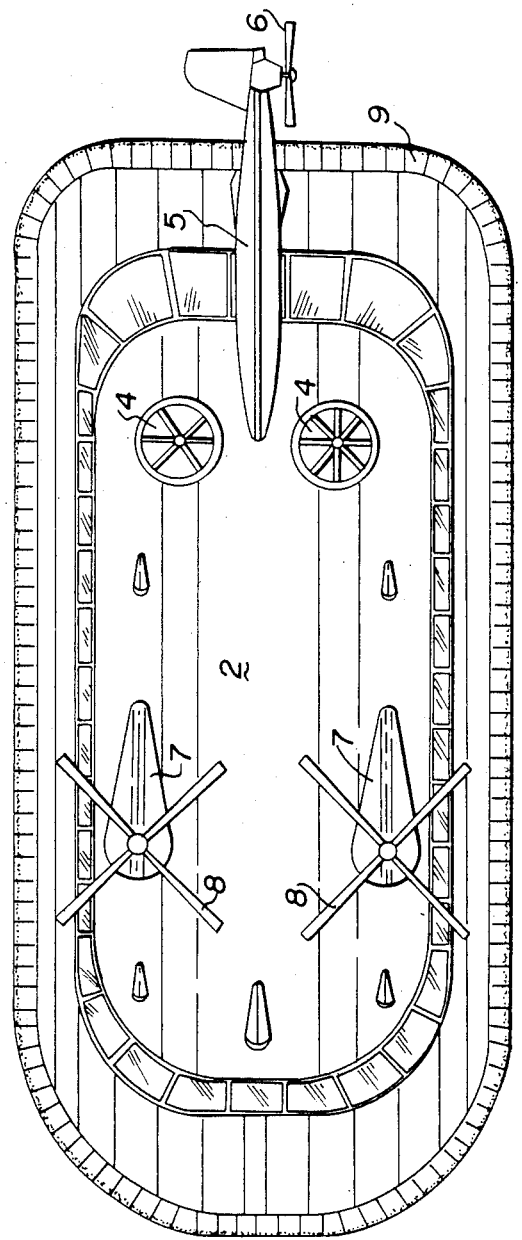
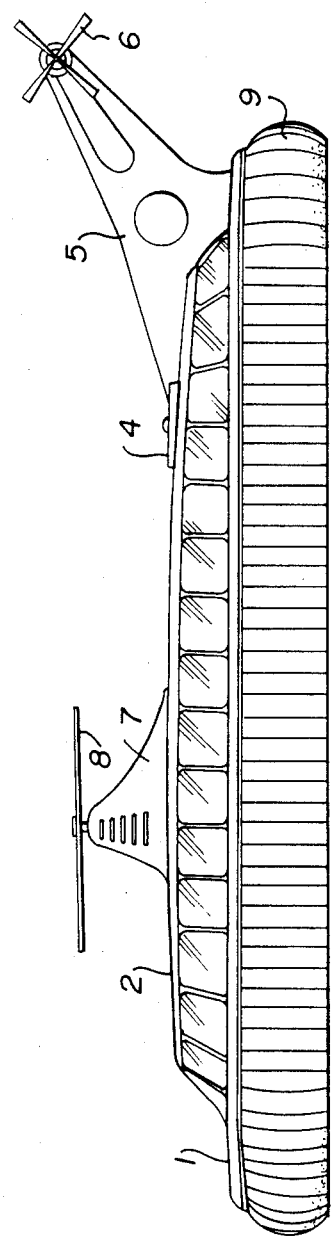
FIG.4
FIG.5

HELI-HOVER AMPHIBIOUS SURFACE EFFECT VEHICLE

This application is a continuation of application Ser. No. 198,818 filed as PCT AU87/00218 on Jul. 16, 1987, published as WO88/00899 on Feb. 11, 1988, abandoned.

The invention relates to a vehicle or craft operating as a hover-craft with a solid closed fuselage with inbuilt lift fan or fans supplying hover lift pressurised air to support fuselage in hover mode. Maneuverability, and propulsion thrust is supplied by one or more deck mounted horizontally placed rotor or rotors of a helicopter configuration, equipped with variable collective and cyclic pitch control. Tail rotor or rotors control torsional forces on the fuselage as well as assisting maneuverability of vehicle.

The invention overcomes the inherent problems of maneuverability and side drift associated with conventional hovercraft equipped with deck mounted thrusters. Trim of craft is effectively improved by the lift moment of upward pull of horizontally rotating propulsion heli-rotor or rotors. Main rotor collective pitch together with cyclic pitch adjustments in conjunction with tail rotor control, allows for precise maneuverability of the craft in all directions at low or high speed providing effective braking and speed control due to main rotor revolutions being maintained and thrust controlled by pitch adjustments. Noise levels are drastically reduced by eliminating the conventional high speed air screw propulsion units. The craft has the ability to climb over obstacles which would otherwise stop a conventional hovercraft propelled by deck mounted airscrew thrusters.

Stability is vastly improved when compared with the conventional aerostatic hovercraft in so far as the pendulumn support of the overhead rotor tends to eliminate reverse banking of the hull in turns. This also assists forward trim by keeping the bow up, thereby preventing bow plough-in and instability of craft. Skirt life is markedly improved by the action of these factors. On land the conventional hovercraft runs away in an uncontrollable manner on down hill slopes whereas with the present inventions, precise control can be maintained under all circumstances due to thrust control provided by the 360° cyclic movement of thrust and lift vector from the heli-rotor. A known structure is shown in Australian Pat. No. 79167, 17th Mar. 1975 by Herbert Leonard Dobb, Titled:-"Air Cushion Pontoon Freight Helicopter".

From these specifications and claims it will be noted that the present invention overcomes the necessity for a twin divided pontoon structure to provide stability, by using a single main hull of wide beam and length proportions utilizing the conventional compartmented under cavity sections with segmented skirts attached. The control and load carrying areas are integrally built into the main superstructure in conjunction with the rotor support structure whereas in the known art the hull is composed of two separate portions, each with their own fan or ductions system for the lift air suspension, with the load carried on a movable platform located between the two pontoons. Loading center of gravity is critical in this known invention whereas with the present invention the acrostatic support area extends well forward, aft and well out each side of loading area with the above mounted rotor assembly providing the necessary stability in addition to hull surface. The high above deck mounted horizontal or near horizontal rigid mounting of the rotor assembly in the present invention maintains the extending rotor blade tips well clear of water or land surface when in forward motion, whereas with the before described known invention the rotor blades are tilted forward to provide thrust for forward movement. This angle is described as up to 45° forward which bring the fast moving rotor tips close to the ground surface causing hazardous operation and the high risk of catastrophic damage occuring in the event of rotor striking an obstruction. Also the pendulumn like support for the hull which the heli-rotor provides in the present invention is lost when the rotor assembly is tilted forward at up to 45°. An important factor with the control of hovercraft, is "side drift", caused by cross winds to the heading direction. By maintaining the rotor in a near horizontal plane, as in the present invention, the ability to equalize this drift by adjustment of the cyclic pitch setting is most effective, whereas in the known type with the rotor blade tilted down towards the direction of travel of the vehicle this cannot be accomplished to a satisfactory degree. The present invention has a large hover base area compared to the heli-rotor swept area. The proportion would vary from 1 to 1, up to 6 to 1, as compared to the known invention which has a proportion of a much larger rotor swept area than the area of the twin pontoons. This ratio is part of the necessary helicopter flight characteristics which is claimed for this known invention.

The present invention is not intended to operate out of aerostatic suspension during motion and is not intended to lift into translational flight at any time due to the dead weight of the vessel at any stage of loading being far over the designed vertical lift capacity of the heli-rotor assembly. Propulsion as a hovercraft supported by aerostatic suspension is solely governed by the degree of cyclic pitch influencing the rotor disc incidence and attitude within a 360° rotation adjustment. The rotor shaft remains in a near perpendicular fixed axis in relation to the hull at all times. With the vehicle being propelled by the heli-rotor fixed in a near horizontal state the down wash has a flattening effect on the water surface and able to moderate rough sea conditions overcoming plough-in and at the same time improving the aerostatic lift moment of hover hull by increasing the ambient air pressure over the lift air fan intakes and adjacent to the external skirt areas to contain leakage and so maintain a high pressure within the plenum chamber of the fuselage body. Rotor down wash lessens and disperses normal hover lift air spray well away from the vessel, improving visability and maintaining a dry superstructure and deck surface.

The invention has been devised to provide a novel form of amphibious craft capable of maneuvering over inhospitable terrain, water, snow, ice, bog or marsh land in an economical and efficient manner.

The device would have wide application of use, providing a completely new concept to the conventional hovercraft for transport needs, tourist, rescue, arctic exploration, agriculture, commercial and defence applications. The heli-hover amphibian would have specific military application in the role of, "Troop assault landing craft", and as "Hover Tanks" for use over snow, bog or marshy terrain, able to maneuver from ocean going transport to land mass.

The device can be produced in an economical manner and readily put into service. Further advantages will be apparent from the following description. According to the invention the device consists of a main flat fuselage body of round, oval or oblong shape which forms the main hovercraft section. The control, passenger, and cargo superstructure are attached to the uppersurface of this fuselage body which supports the heli-rotor or rotors assembly and tail rotor or rotors and drive engine assembly. The deck area may be open with webbed or formed super structure supporting heli-rotor assembly, standing well above and clear of open deck area. Also incorporated within or adjacent to the main hover fuselage are the lift air fan or fans and drives which supply pressurised lift air to the lower air cushion support cavity contained within the periferal flexible segmented skirts with compartmented under cavity sections equipted with stability truncated skirts attached to the main hover fuselage. Built-in static bouyancy is incorporated within the main fuselage structure to support craft when at rest on water and not operating in a hover mode. Craft can be produced in various configurations depending on application, using single, co-axial contra-rotating heli rotors as single installation or multiple installations, arranged in tandem, dual or quad formation either as meshing or non-meshing assemblies. Various configurations and design of air cushion support systems and skirts can be incorporated on the underside of main fuselage to provide an efficient hover air cushion base.

Figure 1:
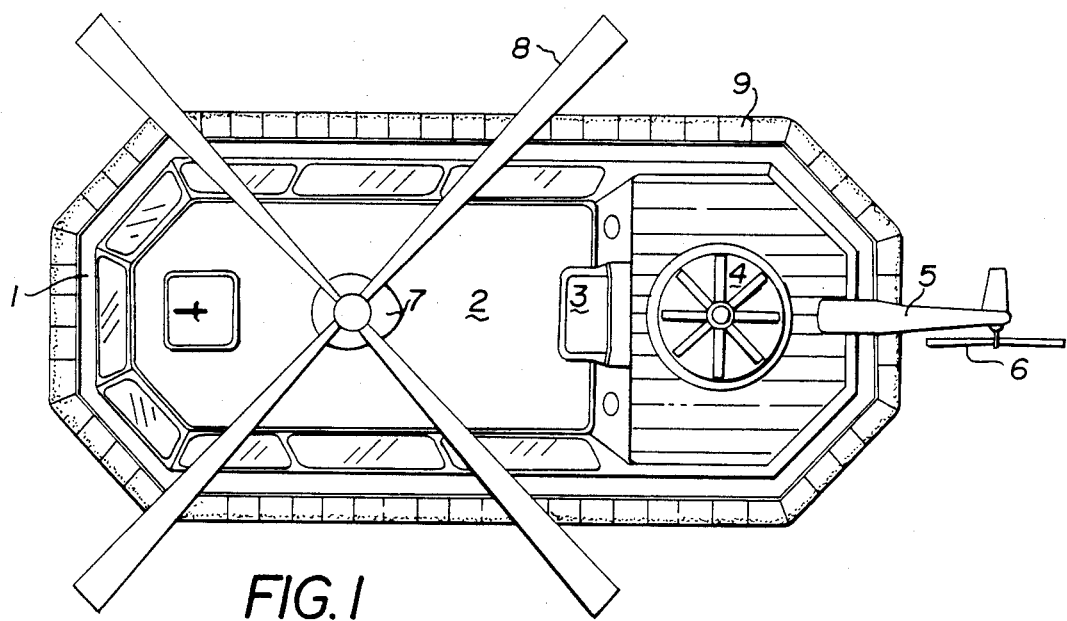
Figure 3:
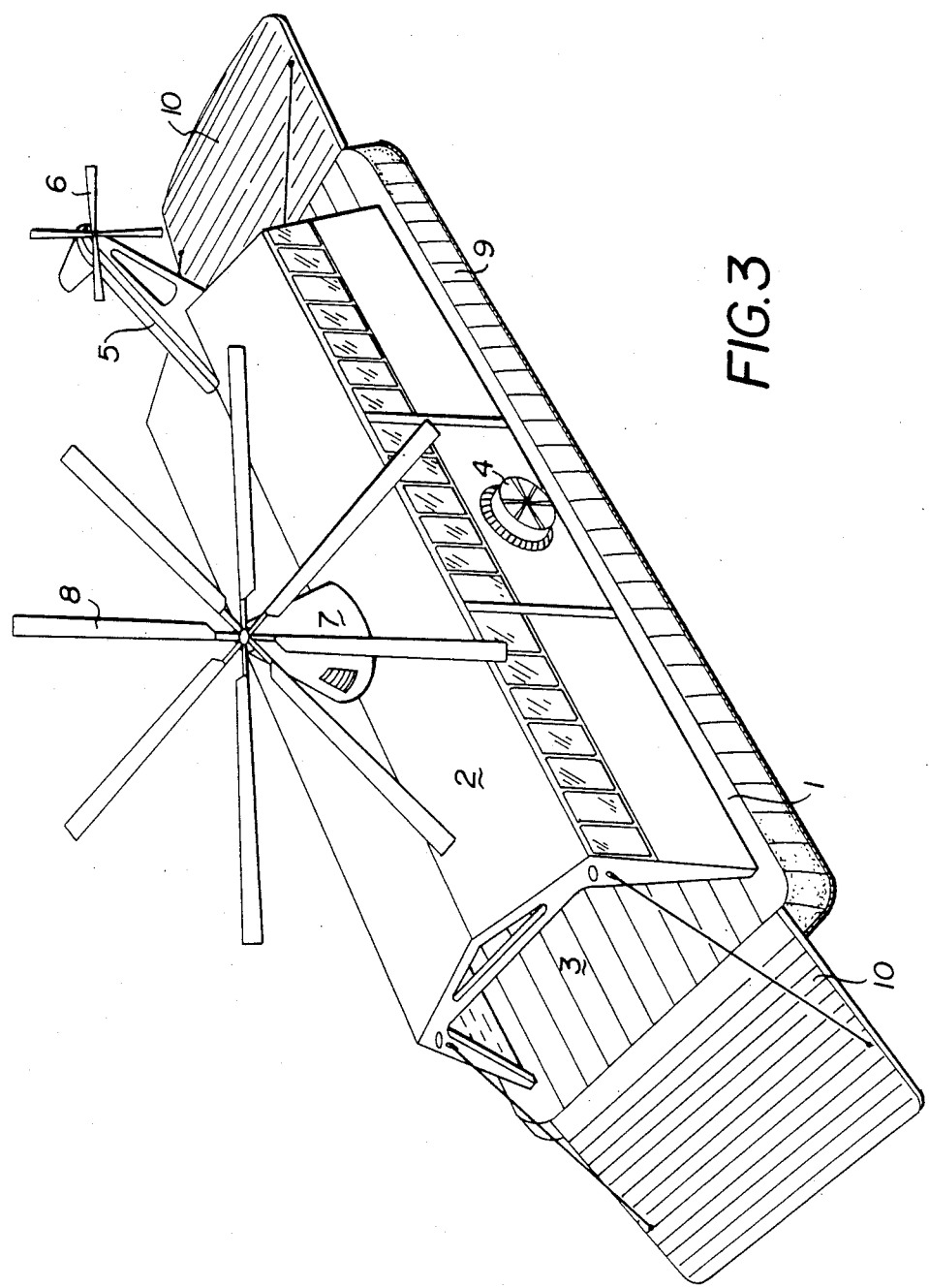
Figure 6A:
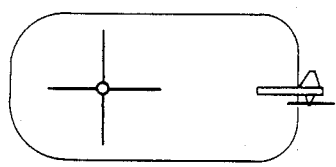
Figure 7A:
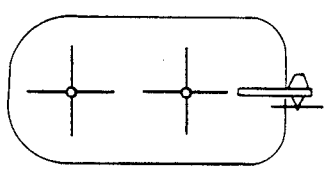
Figure 8A:
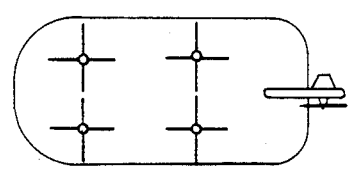
Figure 6B:
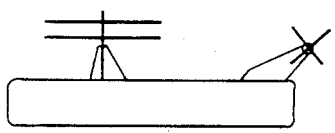
Figure 7B:
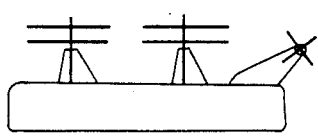
Figure 8B:
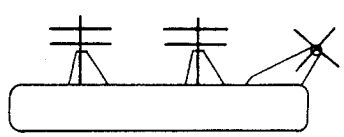
Figure 6C:
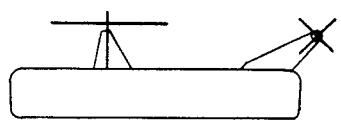
Figure 7C:
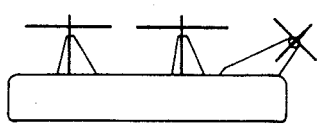
Figure 8C:
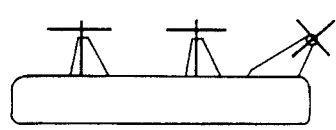

The invention will now be shown in following drawings in which:

FIG. 1. show the top view of a craft with single heli-rotor with tail rotor arrangement;

FIG. 2. shows FIG. 1. in elevation;

FIG. 3. shows a perspective view of invention applied to a vehicle ferry or transport vehicle;

FIGS. 4 and 5 show, respectively, a top view and a side view of a craft in accordance with the present invention, having dual heli-rotors with tail rotor arrangement; and FIGS. 6A, 7A, and 8A diagramatically show top views while FIGS. 6 B and C, 7 B and C, and 8 B and C show diagramatic side views of paired, contra-rotating heli-rotors and single heli-rotors in single configuration, tandem configuration and quad configuration, respectively FIGS. 1 and 2 show a preferred application of the invention as conceived, applied to a vehicle or vessel to be used over land, water, swamp, snow, ice or in rough formed guideways as a passenger, cargo carrying transporter. The main hovercraft fuselage body 1 houses the under open mouthed multiple plenum-chambers with their outer peripheral and divisional borders arranged in the formulation of truncated skirts 9. Above the roof of these suspension support compartment are the fan chambers and ducting leading to outlets located in the roof of the suspension compartments to so provide the pressurized lift air generated by the lift fan 4, passing into the distributer compartment and then via the ducting to spaced air outlets located in the ceiling of each plenum compartment and the segmented cones or fingers used on the trunkated skirts 9. These skirts may be independently supplied with pressurised air from a separated fan system, depending on model and application. Main fuselage body 1 has built-in static bouyancy tanks or foam filled compartment to support the craft when not in hover mode while resting on water. Skids or other fixed or retractable structure act as support means on hard surfaces. The control cabin superstructure 2 supports the heli-rotor assembly 7 or can have independent support structure integral with hover fuselage body 1 depending on model and application. The lift fan assembly 4 providing suspension lift air can be located where shown aft or at any other suitable position on the superstructure depending on model and application. Craft can have a single heli-lift rotor assembly as shown at 7 or can have a multiple of assemblies arranged in tanden or quad formation of single or multi-rotor configuration depending on model and application as shown in FIGS. 4, 5, 6A-6C, 7A-7C, and 8A-8C. Rotors blades 8 have collective and cyclic pitch functions similiar to the normal helicopter controls. The antitorque tail rotor assembly 5 is located aft and is direct coupled to main rotor by mechanical or hydraulic means, with rotor 6 being variably pitched. Both the main rotor and the tail rotor variable pitch characteristics are controlled from the main control station. Rear anti-torque mode can be by rotor or pressurised air thruster. FIG. 3 of the drawings shows an application of the concept of the invention to a vehicle ferry or cargo transporter. The embarking or dissembarking ramps 10 can set up as a retractable or hinged action to act as sea doors when the vessel is in operation.

To those skilled in the art to which the invention relates; many changes in construction, design and widely differing embodiments and applications of the invention will suggest themselves without departing from the spirit and scope of the invention. The disclosures and descriptions herein are purely illustrative and are not intended to be in any sense limiting or being restricted to a precise form.

I claim:

1. A heli-hover amphibious craft, comprising: a main hover craft fuselage body structure including a single hull provided with a deck, said hull being defined by a compartmental under base cavity extending downward with divisional and perimeter walls formed by air cushion containing means for containing suspension air, said fuselage body being provided with at least one built-in duct extending through said deck to said base cavity;
   at least one deck mounted fan means for delivering pressurized air through said duct;
   a superstructure attached to said fuselage body;
   at least one horizontally rotating heli-rotor assembly supported well above said deck by said superstructure, said heli-rotor assembly being driven by a substantially vertically fixed shaft;
   anti-torque means mounted on an aft end of said fuselage body; and
   a drive means operatively connected to said heli-rotor assembly and anti-torque means for propelling the craft.

2. A heli-hover amphibious craft according to claim 1, including a counterrotating rotor positioned co-axially with said heli-rotor assembly.

3. A heli-hover amphibious craft according to claim 1, including an additional heli-rotor assembly, wherein said rotor assemblies are positioned in a tandem configuration.

4. A heli-hover amphibious craft according to claim 3, including additional heli-rotor assemblies wherein said rotor assemblies are positioned in a quad configuration.

5. A heli-hover amphibious craft according to claim 1, wherein said anti-torque means comprises a tail rotor attached to an elevated tail structure on the aft portion of the fuselage body.

* * * * *